June 21, 1960

R. C. PATTERSON 2,941,517

APPARATUS AND METHOD FOR FIRING COMMINUTED FUEL

Filed Dec. 12, 1957

INVENTOR.
ROBERT C. PATTERSON
BY
Arthur C. Firl
AGENT

June 21, 1960
R. C. PATTERSON
2,941,517
APPARATUS AND METHOD FOR FIRING COMMINUTED FUEL
Filed Dec. 12, 1957
3 Sheets-Sheet 2
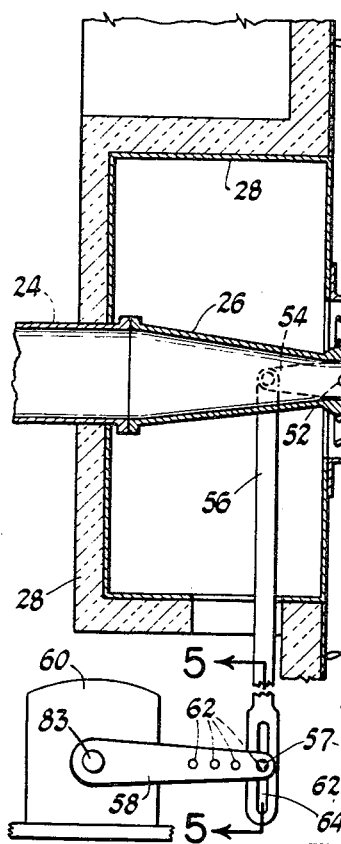
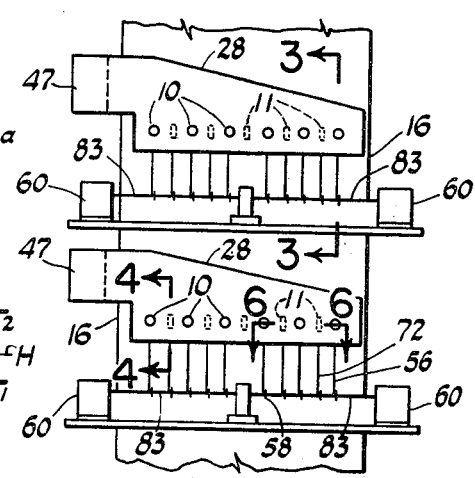
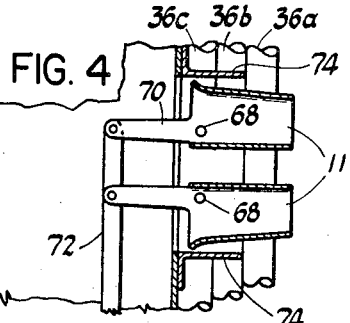
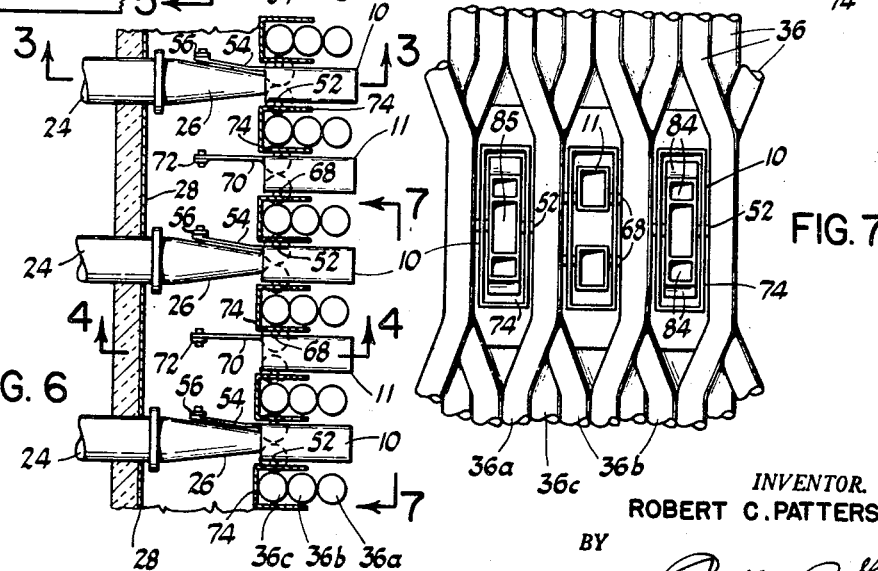
INVENTOR.
ROBERT C. PATTERSON
BY
*Arthur C. Firl*
AGENT

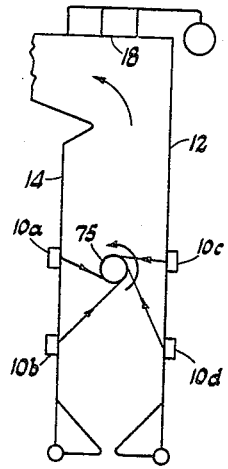 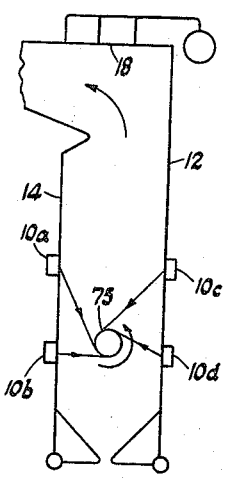 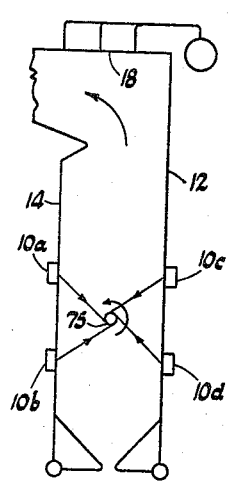 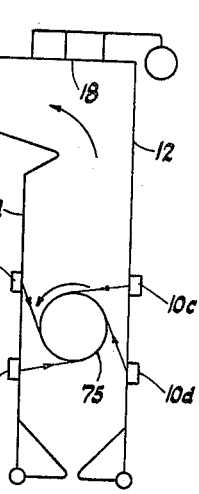
FIG. 8   FIG. 9   FIG. 10   FIG. 11
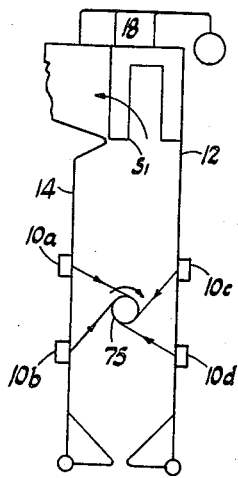 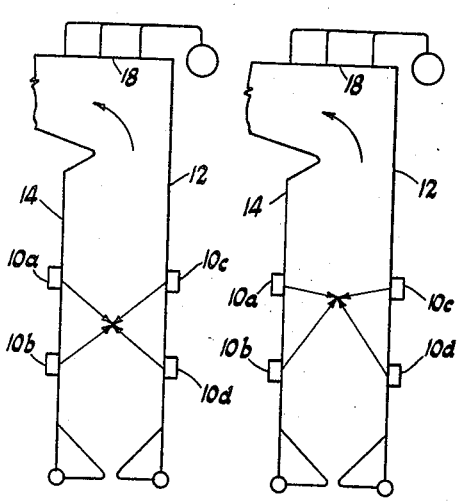 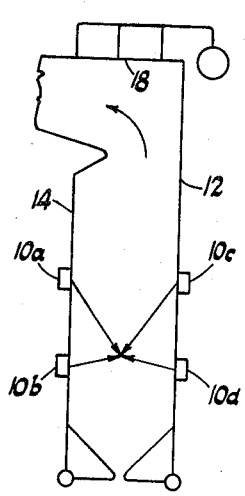
FIG. 12   FIG. 13   FIG. 14   FIG. 15
INVENTOR:
ROBERT C. PATTERSON
BY
AGENT United States Patent Office 2,941,517
Patented June 21, 1960

2,941,517
APPARATUS AND METHOD FOR FIRING COMMINUTED FUEL

Robert C. Patterson, Chattanooga, Tenn., assignor to Combustion Engineering, Inc., New York, N.Y., a corporation of Delaware Filed Dec. 12, 1957, Ser. No. 702,446

6 Claims. (Cl. 122—235)

The invention relates generally to apparatus and method of burning finely divided fuel in liquid, solid or gaseous state in a furnace chamber, specifically, in the water-cooled furnace of a steam generator in which water is evaporated and the steam is superheated for power generator or other uses.

The invention is more particularly concerned with the firing of finely divided fuel in a manner which is generally known as tilting turbulent firing, one such method being disclosed in the U.S. patent issued to H. Kreisinger et al., No. 2,363,875. This patent teaches the burning of comminuted fuel in a furnace by discharging through the furnace wall, streams of fuel and air in directions tangential to an imaginary vertical firing cylinder centrally located within the furnace chamber, and by way of burners which are tiltable in a vertical plane. This is generally known as vertical tangential firing with tilting burners.

When firing fuel in the above manner a whirling mass of gases in produced taking the form of a vertically elongated and horizontally rotating body of gases. These gases usually rise toward the furnace top in following a spiral path, and generally leave the furnace chamber by way of gas outlet leading into a horizontally disposed gas passage.

In an installation of the above type in which vertical tangential firing is employed, the gas distribution across the furnace in the upper part thereof becomes unbalanced, causing more gas to flow on one side of the furnace than on the other and producing gas temperatures which are higher on one side of the gas outlet than on the opposite side. It was found that this is largely due to the spin-action of vertical tangential firing and results in non-uniform gas temperatures entering the superheater and other heating surfaces that are provided near the furnace gas outlet or in gas passages beyond the furnace chamber. Such unequal temperatures are undesirable since they result not only in inefficient heat transfer from the gases to the working fluid, but in many cases have contributed to the overheating and failure of steam heating tubes.

The beneficial features of tilting tangential firing of pulverized, liquid or gaseous fuels are highly important in boiler operation and are well known. Because of the high turbulence created such firing promotes complete and intense combustion of the fuel within the furnace chamber. It further results in high heat transfer rates between the combustion gases and the heating surfaces of the furnace walls. Accordingly, it is exceedingly desirable to find ways and means whereby tangential firing can be utilized in a manner which would, in itself, result in a uniform gas flow pattern when the gases leave the furnace chamber.

The present invention achieves the above objective by a novel method of turbulent and tangential firing which, while maintaining the benefits of tilting tangential fuel burning, results, in itself, in a gas flow and temperature pattern which can be maintained substantially uniform across the furnace width.

It is therefore a primary object of the invention to provide an apparatus and method for firing finely divided fuel in a furnace in a tilting tangential manner which results in a stream of gases of substantially equal distribution across the width of the furnace outlet with respect to mass flow (pounds per square foot of flow area).

Another important object of the invention is to produce in a tangentially fired furnace gas temperatures which are substantially uniform across the furnace gas outlet.

Other and further objects of the invention will become apparent to those skilled in the art from the detailed description thereof when taken in conjunction with the accompanying drawings wherein:

Fig. 2 is a front elevational view of a portion of the steam generator taken on lines 2—2 of Fig. 1, and illustrates the herein disclosed novel horizontal arrangement of rows of tangentially fired burners;

Fig. 3 is an enlarged sectional view taken on line 3—3 of Figs. 2 and 6, of the fuel nozzles and the environment thereof as mounted in the furnace wall;

Fig. 4 is an enlarged elevational section through the air nozzles as mounted in the furnace wall, when taken on line 4—4 of Figs. 2 and 6;

Fig. 5 is a section through the adjusting device provided at the lower end of the nozzle tilting rod, taken on line 5—5 of Fig. 3;

Fig. 6 is a plan section of a portion of the furnace wall when taken through the burner and air openings, on line 6—6 of Figs. 1 and 2.

Fig. 7 is a partial inside view of a portion of the furnace wall showing the water wall tubes bent around the fuel and air opening; when viewed from line 7—7 of Figs. 1 and 6;

Figs. 8 and 9 are diagrammatic representations of an elevational section through the steam generator shown in Fig. 1 illustrating how the gas mass is raised or lowered, respectively, in the furnace by tilting the burners;

Figure 1:
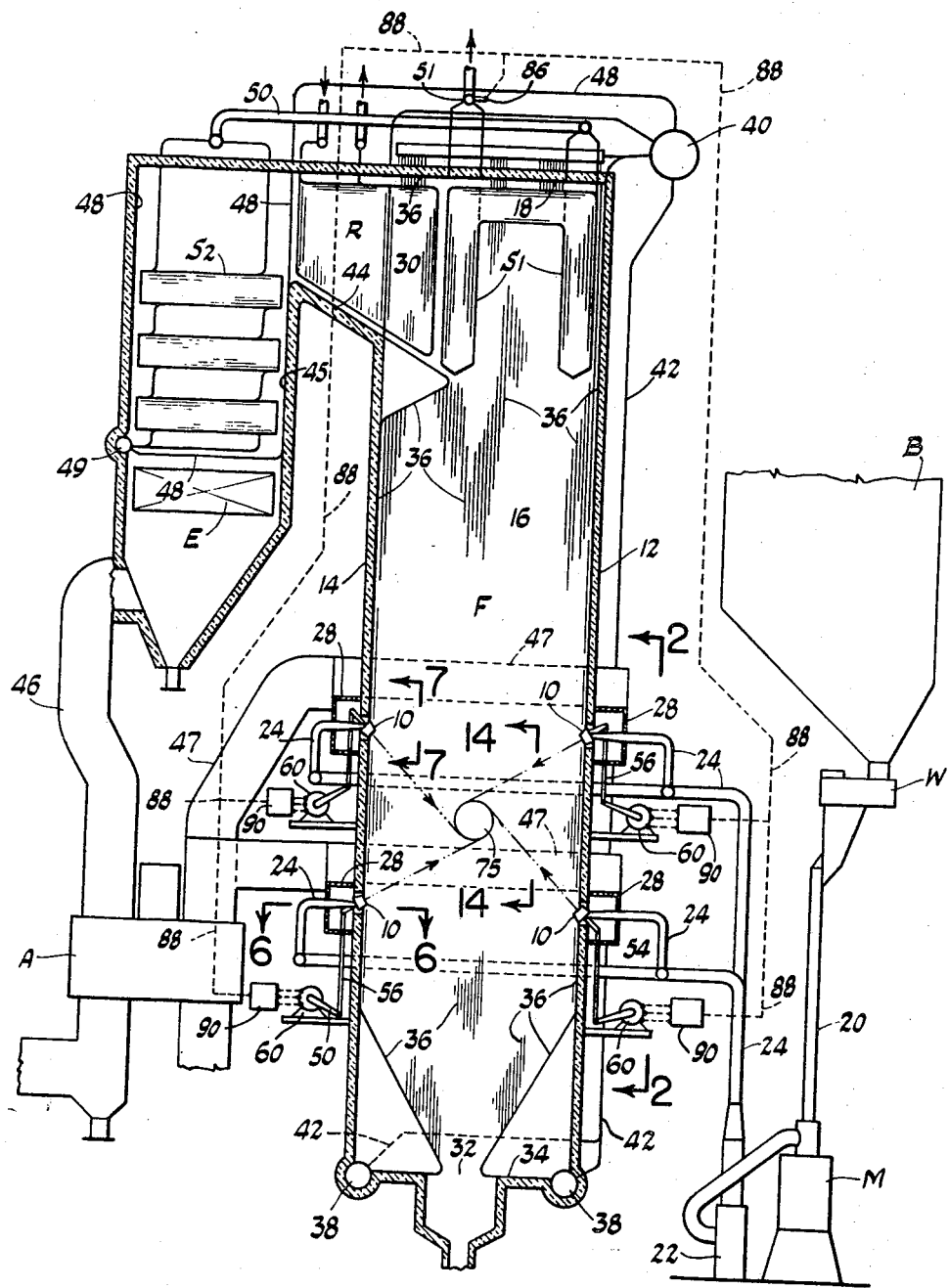
Fig. 1 shows a steam generator having an upright furnace chamber that is equipped with my herein disclosed horizontal arrangement of tangentially fired tiltable burners.

Figs. 10 and 11 are diagrammatic elevational sections of the steam generator illustrated in Fig. 1; Fig. 10 showing the forming of a flaming gas mass of high concentration and intensity by directing the fuel and air streams towards a firing circle of small diameter; and Fig. 11 showing the forming of a flaming gas mass of larger periphery by discharging fuel and air through burners in a direction tangential to a large firing circle;

Fig. 12 diagrammatically shows a steam generator similar to that of Fig. 1 with the fuel and air streams directed to cause rotation of the gases in opposite direction (clockwise) from that indicated in Fig. 1;

Fig. 13 is a diagrammatic sectional elevation of a steam generator equipped with my inventive horizontal burner system in which the fuel and air streams are directed head on causing great turbulence without rotation of the gas mass; and Figs. 14 and 15 illustrate diagrammatically how the gas mass thus produced in the embodiment of Fig. 13 can be shifted into the upper portion of the furnace or into the lower portion of the furnace.

In the preferred embodiment shown in Figs. 1 and 2, fuel and air is being discharged through fuel nozzles generally designated 10 and air nozzles 11 into a furnace chamber F bounded by front wall 12, rear wall 14, side walls 16, and a roof 18. From a fuel bunker B the fuel is delivered to a weighing apparatus W and to a pulverizer M by way of fuel pipe 20. After having been pulverized to a desired fineness, a mixture of fuel and air is delivered to each fuel nozzle 10 by means of exhauster 22 and fuel pipes 24. As shown in Fig. 3 these pipes are connected to a transition piece 26, transforming the circular cross-section of pipe 24 to a rectangular cross-section of the fuel nozzle 10. Heated air for burning the fuel enters the furnace through hot air duct 28 and air nozzles 11, see Fig. 2.

The combustion gases produced within the furnace F rise to the top of the furnace and pass through a gas offtake or furnace outlet 30 formed in the upper portion of the rear wall 14 directly below roof 18. Ash in solid or liquid form is removed through ash discharge opening 32 provided in the floor 34 of the furnace F. The walls, roof and floor of the furnace chamber are lined with water cooled tubes 36 receiving water from headers 38 arranged along the sides of the bottom of the furnace. These headers in turn are supplied with water from a steam and water drum 40 by way of downcomer tubes 42. Steam is generated in the water wall tubes 36 of the furnace and is discharged together with recirculated water into drum 40 wherein the steam is separated from the water by well known means (not shown). A high temperature superheater section S1 is arranged in the upper portion of the furnace F. The combustion gases flow over and give up heat to the superheater S1 before entering the furnace offtake 30 and before passing over reheater section R disposed in the horizontal gas pass 44 leading into a downwardly extending vertical gas pass 45. A low temperature superheater section S2 is arranged in gas pass 45 and is followed by an economizer section E, a duct 46, and an air heater A the order named. Upon leaving the air heater A the gases pass into the atmosphere through an induced draft fan and stack, not shown. Air heated in the airheater A flows through ducts 47 and 28 to air nozzles 11 and furnace F.

Saturated steam collected in steam and water drum 40 is conducted to low temperature superheater section S2 by way of connecting tubes 48 and inlet header 49. After having absorbed a predetermined amount of heat from the gases the steam is conducted to the high temperature section S1 by way of pipe 50 from whence the steam passes through outlet header 51 to a steam turbine (not shown). Having given up some of its energy in a high pressure stage of the turbine the steam is returned to the reheater R to be reheated at a lower pressure. The reheated steam thereupon is returned to a low pressure stage of the turbine for final extraction of energy.

The present invention provides means for burning comminuted, liquid or gaseous fuel in a horizontal tangential manner. For this purpose burner nozzles 10 and air nozzles 11 are alternately arranged in horizontal rows. In the preferred embodiment of Figs. 1 and 2 two rows of fuel nozzles 10 and air nozzles 11 are provided in each front wall 12 and the rear wall 14 of the furnace. More than two rows, or only one row in one wall and two rows in the opposite wall could be used. Nozzles 10 and 11 are adapted for tilting in a vertical plane as shown in detail in Figs. 3 and 4. Thus the fuel nozzle 10 which is shown in a horizontal position can be tilted about an axis 52 by arm 54 which, by being operatively connected through rod 56, bolt 57 and arm 58 to motor means 60, permits the increasing or decreasing of the angle of tilt of nozzle 10 with the horizontal H.

The normal tilting range is usually 30° above and 30° below the horizontal H, or a total of 60°. However, this tilting range can be increased or decreased by switching the connection between arm 58 and rod 56 to any one of the holes 62 in arm 58, four such holes being shown in Fig. 3. In this manner the effective length of arm 58 can be increased or decreased thereby increasing or decreasing, respectively, the tilting range of nozzle 10.

Furthermore to permit the raising or lowering of the entire tilting range of the fuel nozzle 10 within the furnace, a slot 64 is provided at the lower end of rod 56 to permit the shortening or lengthening of the effective length of rod 56. Thus for a given angular movement of arm 58, a shortening of rod 56 will permit an increase of the tilting angle T2 above the horizontal H and a corresponding decrease of the angle T1 below the horizontal H. Or a lengthening of the effective length of rod 56 will increase the angle T1 and decrease the angle T2. To facilitate such adjustments the bolt 57 is provided with a shoulder 66 against which the bolt 57 can be tightened, leaving arm 58 free to rotate in hole 62.

In the preferred embodiment of Figs. 1 and 2, each nozzle 10 is provided with the above described linkage for tilting. My invention of course could also be practiced in an organization wherein only selected nozzles are equipped for tilting and others are stationary.

The rows of nozzles shown in the preferred embodiment of Figs. 1 and 2 include air nozzles 11 alternately arranged with fuel nozzles 10. Nozzles 11 are adapted for tilting in a similar manner as are nozzles 10. As shown in Fig. 4, a pair of nozzles 11 are provided, each nozzle pivotally mounted for tilting about a pivot 68 by means of arm 70 and bar 72 and other linkage elements, not shown, but similar to those employed in connection with fuel nozzle 10. Adjustment of the tilting range of air nozzle 11 is also provided in a manner similar to that shown and described for fuel nozzle 10. Obviously other suitable devices well known in the art could be used to accomplish controlled nozzle tilting.

Figs. 6 and 7 show a plan section and an elevational view of the furnace wall portion through which the fuel and air nozzles 10, 11 pass. For this purpose openings are provided in the tubular water wall lining of the wall by bending suitable portions of tubes 32 out of the way to form openings for accommodating fuel and air nozzles 10, 11. In the preferred embodiment shown in Fig. 7 two tubes 36a and 36b, for examples, are bent aside and brought in line and in front of tube 36c. In this manner an opening equal to the approximate width of two tubes is made available for nozzles 10 and 11. A burner casing 74 is provided which is attached to the tubes 36 in any suitable manner and on which are supported the burner nozzles 10 and air nozzles 11 by means of pivots 52 and 68, respectively.

Although in the preferred embodiment herein shown the water wall tubes 36 are disposed in vertical parallel positions, suitable openings for horizontal rows of fuel and air nozzles 10, 11 could be provided with equal facility in furnace walls lined with horizontally disposed tubes.

It is well known in the operation of furnaces having walls lined with fluid cooled tubes, that the amount of heat absorbed by these cooled walls can be increased or decreased by lowering or raising, respectively, the mass of burning gases such as, for example, by tilting the burners. It is also well known in the operation of water cooled furnaces equipped with tangential firing that the heat absorption of the furnace walls can be increased or decreased by increasing or decreasing, respectively, the imaginary firing circle towards which the fuel and air streams are tangentially directed. By increasing or decreasing the heat absorbed by the walls in this manner the temperature of the gases leaving the furnace is decreased or increased, respectively, which affords a convenient method of decreasing or increasing, respectively, the temperature of the superheated steam, since more or less heat is thereby made available to the superheater. Horizontal turbulent firing as disclosed herein is particularly well adapted for control of superheated steam temperature by raising or lowering the gas mass, or by increasing or decreasing the firing circle.

It was found when operating with vertical tangential firing as heretofore practiced in the art, that the unequality of the temperature and mass flow of the gases leaving the furnace is intensified when tilting the burners upwardly to obtain a higher superheated steam temperature, or when increasing the firing cylinder diameter to obtain a lower superheated steam temperature.

My invention avoids this disadvantage. By employing horizontal turbulent firing, uniform gas temperatures and mass flow across the furnace outlet can equally well be achieved when tilting the burner nozzles 10a, 10b, 10c and 10d, to raise the gas mass as shown in Fig. 8; or when tilting the said burner nozzles to lower the gas mass as shown in Fig. 9. Furthermore, such uniformity of gas temperature and mass flow is not effected when increasing or decreasing the diameter of the firing cylinder 75 as illustratively shown in Figs. 10 and 11, respectively, or when reversing the direction of rotation as shown in Fig. 12.

The herein disclosed invention also contemplates arranging the direction of fuel and air stream issuing from burners 10a, 10b, 10c, and 10d, in such a manner that head-on collision occurs between the opposing streams, as shown in Fig. 13. Furthermore, these streams can be tilted up, as shown in Fig. 14, or tilted down as shown in Fig. 15 for the purpose of controlling the heat absorption in the furnace walls and as a consequence thereof, the temperature of the superheated steam.

To facilitate the raising and lowering of the gas mass within the furnace, or the increasing and decreasing of the diameter of the firing cylinder in response to steam temperature, a temperature indicating device 86 is provided in the outlet header 51 of superheater S1 as shown in Fig. 1. Variations of steam temperature are received through conductors 88 by a transmitter 90 and translated into suitable impulses which cause motor means 60 to raise or lower in well known manner the burner nozzles 10. Thus a rise in steam temperature will result in a lowering of the burner tilt and gas mass and a drop in steam temperature will cause a raising of the gas mass within the furnace by an upward tilt of the respective burner nozzles 10. Also a rise in steam temperature will result in a reduction of firing cylinder diameter and a drop in steam temperature cause an increase of firing cylinder diameter.

While I have illustrated a preferred embodiment of my invention, it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

I claim:

1. The method of operating an elongated water-cooled furnace fired with comminuted fuel and having a combustion chamber including two opposing upright chamber walls, means forming a gas offtake opening at one end of said chamber said opening extending parallelly to said walls across said chamber, and a pair of spacedly arranged and substantially horizontal rows of burners disposed in each of said two opposing chamber walls for discharging into said furnace chamber through said burner rows in opposite walls thereof streams of fuel and air in directions tangentially to an imaginary body of revolution, comprising the steps of producing a mass of burning gases revolving about a generally horizontal axis of revolution that is parallel to said walls and to said gas opening; and displacing said axis of revolution by changing the tangential directions of said streams to cause said axis of rotation and revolving gas mass to approach or recede respectively, from a selected portion of said walls so as to increase or decrease the heat absorption of said wall portion and to decrease or increase the temperature of the gases across said gas offtake as the gases leave said furnace chamber and flowing said mass of gases toward and through said gas offtake in a direction falling in a plane generally perpendicular to said horizontal axis.

2. The method of operating an elongated water-cooled furnace fired with comminuted fuel and having a combustion chamber defined by four upright walls, a pair of spacedly arranged and substantially horizontal rows of burners disposed in each of two opposing said chamber walls for discharging into said furnace chamber through said burner rows in opposite walls thereof streams of fuel and air in directions toward an imaginary horizontal axis and a gas offtake at one end of said chamber in one of said opposing walls, comprising the steps of producing a mass of burning gases surrounding said horizontal axis, displacing said axis by changing the directions of said streams to cause said axis and gas mass to approach or recede respectively, from a selected portion of said walls so as to increase or decrease the heat absorption of said wall portion and to decrease or increase the temperature of the gases across said gas offtake and discharging said gases from said chamber by way of said gas offtake in a direction generally parallel to the two upright walls other than said opposing walls.

3. The method of controlling and equalizing the heat content of the combustion gases leaving the outlet of a furnace chamber that is defined by water-cooled front, rear and right and left side walls, said outlet generally extending across said rear wall at one end of said chamber, and having means for discharging streams of fuel and air into said furnace chamber from a plurality of points spacedly arranged along each of two parallel and vertically spaced horizontal rows in the front wall and each of two parallel and vertically spaced horizontal rows in the rear wall, comprising the steps of directing said streams of fuel and air tangentially towards a plurality of imaginary firing circles, each circle lying in a substantially vertical plane and serving as the target of a set of four specific fuel and air streams each stream exclusively originating from one of said four horizontal rows; and altering the angle to the horizontal of the directions of said fuel and air streams to increase or decrease the diameter of the firing circles whereby to increase or decrease respectively, the temperature of the gases that are generated by the burning of said fuel and air streams as these gases approach said furnace outlet, and discharging said gases from said furnace through said outlet in directions parallel to said side walls.

4. The method of controlling the temperature of the combustion gases leaving a steam generating and steam heating apparatus having an elongated upright furnace defined by at least partially water-cooled front, rear and side walls, means forming a generally horizontal gas offtake disposed in the rear wall adjacent said roof and extending between said side walls and means for discharging streams of fuel and air into the furnace from a plurality of burners forming at least two horizontal rows spaced one from the other in each of said rear and front walls, said streams being directed tangentially to an imaginary firing cylinder having a longitudinal generally horizontal axis, comprising the steps of forming a burning, rotating mass of gases in substantially the shape of a cylinder with the longitudinal axis thereof disposed in a generally horizontal direction; and raising or lowering said rotating cylindrical mass of gases by respectively raising or lowering said tangentially directed streams of fuel and air, whereby respectively to increase or decrease the temperature of the gases leaving said furnace gas offtake in direction generally parallel to said side walls.

5. In a furnace chamber defined by a water-cooled wall enclosure including wall means forming a gas outlet provided in said enclosure, the combination of a plurality of burner nozzles tiltably mounted in said enclosure and forming at least four substantial horizontal rows, at least two of said burner rows being mounted in a portion of said water-cooled enclosure that faces an oppositely disposed portion of said enclosure in which another of said rows of burners is being mounted, said nozzles being tilted at an angle with the horizontal and in directions tangential to an imaginary firing cylinder, said cylinder being horizontally disposed within said furnace chamber and parallel to the wall means defining said gas outlet; and means to increase or decrease the tilting angle of said nozzles.

6. In a furnace chamber having two opposing walls lined with upright fluid cooled tubes, a combustion gas outlet provided in one of said opposing walls, means forming a plurality of openings in said opposing walls for discharging fuel and air into said chamber for burning, said openings being arranged in two vertically spaced, horizontal rows in each of said opposing walls, said fluid cooled tubes having portions defining said openings; vertically tiltable fuel and air discharge nozzles mounted in said openings and adapted to discharge streams of fuel and air in directions tangential to a plurality of imaginary firing circles, each circle lying in a substantially vertical plane normal to said opposing walls; means for uniformly tilting said nozzles vertically to increase or decrease the diameters of said firing circles and means for discharging the combustion gases from said furnace chamber by way of said gas outlet in directions normal to said opposing walls.

References Cited in the file of this patent

UNITED STATES PATENTS

| | | |
|---|---|---|
| 1,792,104 | De Lorenzi | Feb. 10, 1931 |
| 2,363,875 | Kreisinger et al. | Nov. 28, 1944 |
| 2,861,526 | Kuppers | Nov. 25, 1958 |